Feb. 3, 1931.  L. CASALE  1,790,853
APPARATUS FOR EFFECTING REACTIONS BETWEEN GASES AT A RAISED TEMPERATURE
Filed June 10, 1927  3 Sheets-Sheet 1

Inventor
Luigi Casale, Deceased
Maria Casale-Sacchi, Adm'x
By Marks & Clerk
ATTORNEYS Feb. 3, 1931.  L. CASALE  1,790,853
APPARATUS FOR EFFECTING REACTIONS BETWEEN GASES AT A RAISED TEMPERATURE
Filed June 10, 1927  3 Sheets-Sheet 2

Inventor
Luigi Casale, Deceased
Maria Casale-Sacchi, Admx
BY
ATTORNEYS

Inventor
Luigi Casale, Deceased
Maria Casale-Sacchi, Admx
BY Marker Clerk
ATTORNEYS Patented Feb. 3, 1931

1,790,853

UNITED STATES PATENT OFFICE

LUIGI CASALE, DECEASED, LATE OF ROME, ITALY, BY MARIA CASALE, NÉE SACCHI, ADMINISTRATRIX, OF RAPALLO, GENOA, ITALY

APPARATUS FOR EFFECTING REACTIONS BETWEEN GASES AT A RAISED TEMPERATURE

Application filed June 10, 1927, Serial No. 197,870, and in Italy June 22, 1926.

In effecting reactions between gases at raised temperatures the recovering of the heat from the hot products of the reaction is of very great economic importance.

Almost always this heat is utilized to bring the gases which have to react to the temperature of reaction, and to attain the purpose the products of the reaction and the gases which are to react are passed through a heat-exchanger. In this manner the amount of the external heat which is necessary to expend is reduced to the minimum and in the case of exothermic reactions it is possible that no external heat may be necessary.

Heat recovering of the aforesaid kind is practised in various industries, for instance in the catalysis of sulphuric anhydride and of carbon monoxide, in the synthesis of ammonia and of methyl alcohol.

The heat exchangers are sometimes placed outside the reaction apparatus, or they can even form part of the same, but the exchangers hitherto used do not attain the purpose sufficiently well, especially those which are part of the reaction apparatus, since said apparatus are generally suitable only for reactions which are very exothermic: in this case a less efficient heat exchange can, it is obvious, answer the purpose.

For effecting reactions between gases at raised temperature Dr. Casale now devised an apparatus in which the heat possessed by the hot products of the reaction is recovered almost entirely and is utilized for heating the gases or the gases which have to react, or for other purposes.

Figure 1:
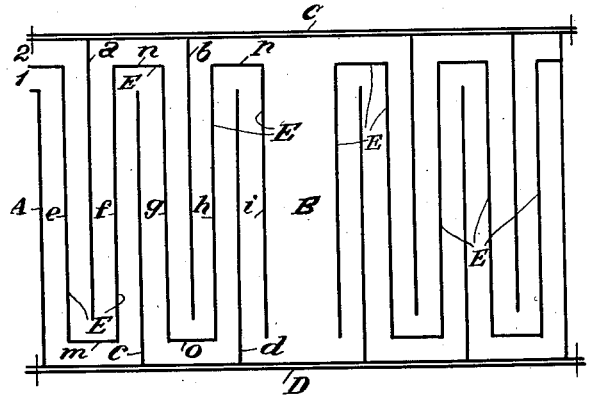
Figure 2:
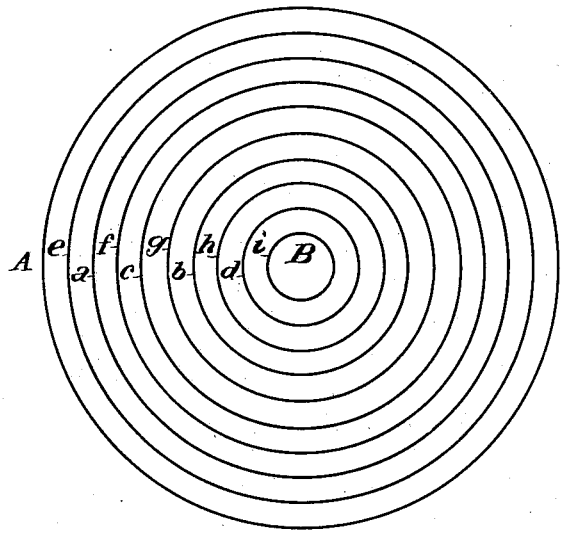

An arrangement of such an apparatus is illustrated in the accompanying drawings, in which Fig. 1 is a vertical section of the apparatus, and Fig. 2 the corresponding plan view.

Figure 3:
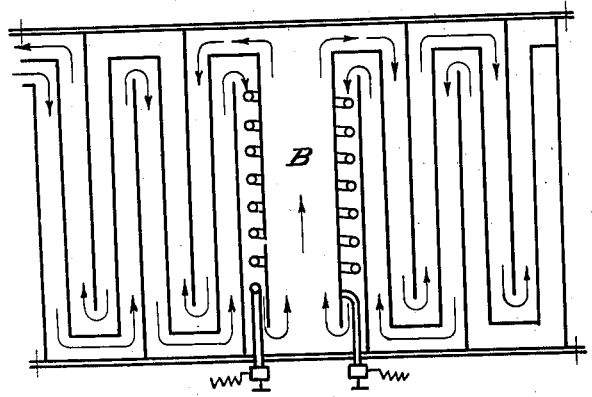
Figure 4:
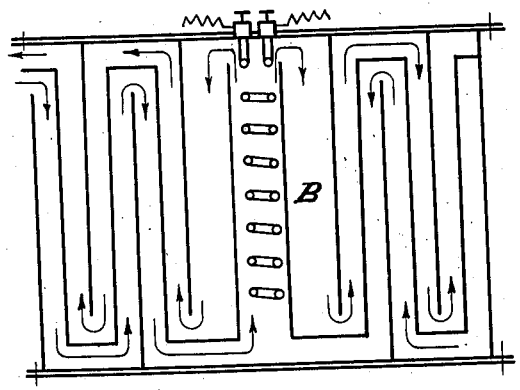
Figure 5:
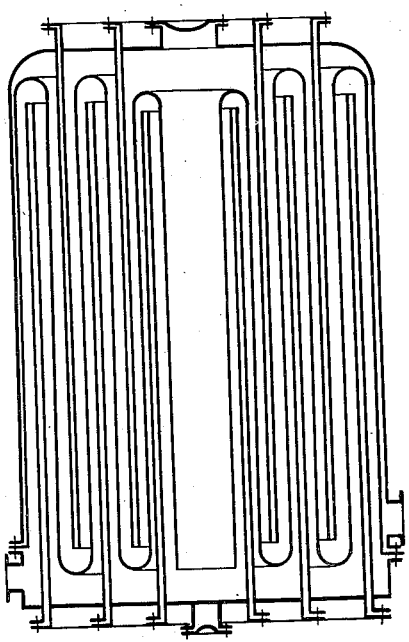
Figure 6:
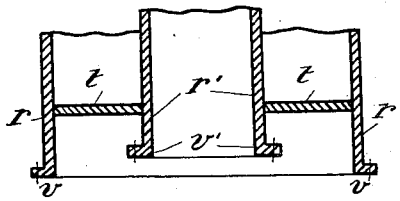
Figure 7:
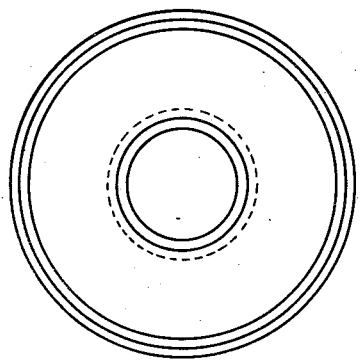

Figs. 3 and 4 are vertical sections of an apparatus constructed in a different manner, while Fig. 5 shows another modified arrangement, Figs. 6 and 7 being details.

The invention, of course, is not limited to the apparatus represented in the drawings, but includes other similar manners of construction.

In the drawings the apparatus is represented as cylindrical, but it is not limited to this form.

In Figs. 1 and 2, A is the external wall of the apparatus, B the space in which occurs the reaction, C and D are two covers which hermetically close the apparatus. The upper cover C has two cylindrical walls $a$, $b$, extending downwards towards the cover D, while the latter has cylindrical walls $c$, $d$, spaced apart from the walls $a$, $b$. It is obvious that the number of the walls which are carried by each cover can also be other than two.

Between these walls is disposed the surface E through which occurs the heat exchange. It is constructed of metallic material and can be completely or partly supplied with small blades or channeling or similar other formations adapted to increase its efficiency in respect of the transfer of heat. In the case represented in the drawing this surface consists of five concentric walls, $e, f, g, h, i$, each connected with the preceding and with the successive ones by means of two annular discs or crowns which are disposed one at the upper and one at the lower edges, as clearly shown in Fig. 1, in which said discs are indicated by the letters $m, n, o, p$.

The cold gases which have to react can enter, for instance, at 1 and pass through the spaces comprised between the walls A and $e$, $f$ and $c$, $c$ and $g$, $h$ and $d$, $d$ and $i$, thus entering the central space B, where the reaction occurs, and thence issued through the spaces comprised between the walls $h$ and $b$, $b$ and $g$, $f$ and $a$, $a$ and $e$ arriving at the exterior at 2, analogously it is also possible to cause the cold gas to enter at 2, and then the product of the reaction will issue at 1.

If the reaction which occurs in B is endothermic, or only weakly exothermic, it is possible, for instance, to provide the space comprised between $d$ and $i$ with an electrical heating device $j$, for instance a spiral, as illustrated in Fig. 3, the cold gases entering at 1. The electric heating device $j$ could be placed in the central part of the apparatus, as shown, by way of example, in Fig. 4.

An arrangement of apparatus which is very advantageous in practice is shown in Figs. 5, 6, 7. Fig. 5 represents the vertical section of the apparatus, Fig. 6 a vertical section and Fig. 7 the corresponding plan of one of the principal elements forming the apparatus. Fig. 5 does not require explanations: the element shown in Figs. 6 and 7 is formed of two cylindrical members $r$ $r'$ connected by means of an annular disc $t$ and having two flanges $v$ $v'$ disposed at different heights. It is important that any packing which may be used to ensure the tightness of the flange be arranged in the colder part of the apparatus.

From the manner in which the apparatus is constructed it is clear that it will be sufficient to vary the number and the dimensions of the surfaces through which occurs the heat exchange, in order to effect as completely as possible the recovery of the heat contained in the hot products of the reaction.

Another advantage consists in having a succession of temperatures regularly decreasing from the interior towards the exterior. This is very important, especially when the apparatus is subject to pressure, since in this case the wall A, which must sustain the pressure, will have a very low temperature and it will therefore be in a better condition of mechanical resistance. In certain cases this arrangement will prevent it from chemical attack to which it might be subjected by coming in contact with the gases at higher temperatures.

The gases between which occurs the heat exchange flow in counter-current, and therefore in the most suitable manner for realizing a rapid and complete heat exchange.

It is not necessary that the walls $a, b, c, d$, be constructed of non-conducting materials, because the difference between the temperature of the gases on the two sides of each of the said walls is relatively so small that the quantity of heat which can pass through the same becomes negligible. Thus the apparatus can be constructed entirely of metal.

The expansions in the apparatus due to the changes of temperature are not impeded and cannot therefore damage the apparatus or affect its good working; and this result is obtained without the use of stuffing-boxes or expansion-joints, thereby allowing simplicity of construction and facility of mounting and dismounting.

Finally, attention may be drawn to the fact that, when one of the gases which has to react consists of vapours of a substance which is liquid or solid at ordinary temperature, or if it is a liquid obtained by liquefaction of a substance which is solid at ordinary temperature, it will be possible, when the hot products of the reaction contain a quantity of heat sufficient for the purpose, to cause said substance to enter at a given point on the path of the gases which have to react, so that the vaporization of said substance is effected by means of the heat recovered from the products of the reaction.

It is evident that the apparatus is well adapted for effecting reactions occurring in the presence of catalysts, as well as for non-catalytic reactions. In the case where catalysts must be used, they could be charged or discharged through holes in the covers C and D, whereby the charge and discharge can be accomplished without removing the said cover.

What is claimed is:—

1. Apparatus for effecting reactions between gases at a raised temperature comprising a centrally disposed reaction chamber, a series of dividing walls arranged externally of the reaction chamber providing alternate upper and lower gas-passage ways, over and under, respectively, the ends of said dividing walls, and a continuous partition dividing said gas-passage ways into two series of spaces, in one of which series of spaces flow the gases to be reacted in heat-exchange relation with the products of reaction flowing through the other series of spaces.

2. Apparatus for effecting reactions between gases at a raised temperature comprising a centrally disposed reaction chamber, a series of dividing walls arranged externally of the reaction chamber providing alternate upper and lower gas-passage ways, over and under, respectively, the ends of said dividing walls, and a continuous partition dividing said gas-passage ways into two series of annular spaces, in one of which series of annular spaces flow the gases to be reacted in heat-exchange relation with the products of reaction flowing through the other series of annular spaces.

3. In an apparatus for effecting reactions between gases at elevated temperatures, the provision at heat exchanging means comprising a series of dividing walls arranged externally of the reaction chamber and providing alternate upper and lower gas-passage ways over and under, alternatively, the ends of said dividing walls, and a continuous partition dividing said gas-passage ways into two series of spaces in one of which gases flow the fluids to be reacted in heat exchange relation with the products of reaction flowing through the other series of spaces.

MARIA CASALE-SACCHI,
*Administratrix of Luigi Casale, Deceased.*